(12) United States Patent
Uchimura et al.

(10) Patent No.: US 11,619,733 B2
(45) Date of Patent: Apr. 4, 2023

(54) MEASUREMENT DEVICE, MEASUREMENT METHOD, AND PROGRAM

(71) Applicant: NEC CORPORATION, Tokyo (JP)

(72) Inventors: Jun Uchimura, Tokyo (JP); Hideaki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 181 days.

(21) Appl. No.: 16/477,246

(22) PCT Filed: Dec. 11, 2017

(86) PCT No.: PCT/JP2017/044351
§ 371 (c)(1),
(2) Date: Jul. 11, 2019

(87) PCT Pub. No.: WO2018/131361
PCT Pub. Date: Jul. 19, 2018

(65) Prior Publication Data
US 2019/0369229 A1 Dec. 5, 2019

(30) Foreign Application Priority Data
Jan. 16, 2017 (JP) ............................. JP2017-004932

(51) Int. Cl.
*G01S 13/72* (2006.01)
*H04B 17/318* (2015.01)
*G01S 13/75* (2006.01)

(52) U.S. Cl.
CPC ............ *G01S 13/726* (2013.01); *G01S 13/75* (2013.01); *H04B 17/318* (2015.01)

(58) Field of Classification Search
CPC ........ G01S 13/726; G01S 13/75; G01S 13/82; G01S 7/40; G06K 19/07; G06K 7/10; H04B 17/318; H04B 1/59; H04B 17/29
See application file for complete search history.

(56) References Cited

U.S. PATENT DOCUMENTS

2007/0273481 A1* 11/2007 Soleimani ............ H01Q 1/2225
340/10.1
2014/0128107 A1* 5/2014 An ............................ G01S 5/12
455/457

(Continued)

FOREIGN PATENT DOCUMENTS

JP 2005-331434 A 12/2005
JP 2007-129688 A 5/2007

(Continued)

OTHER PUBLICATIONS

International Search Report for PCT/JP2017/044351 dated Jan. 16, 2018 (PCT/ISA/210).

(Continued)

*Primary Examiner* — Timothy X Pham
(74) *Attorney, Agent, or Firm* — Sughrue Mion, PLLC

(57) ABSTRACT

Provided is a measurement device including: a reception strength measurement unit configured to measure reception strengths of radio signals which have difference frequencies and which are transmitted from a plurality of transmission devices; and a recording unit configured to sequentially record the reception strengths for the plurality of transmission devices.

10 Claims, 8 Drawing Sheets

(56) References Cited

U.S. PATENT DOCUMENTS

| | | | |
|---|---|---|---|
| 2014/0140226 A1* | 5/2014 | Yang | H04W 36/0085 |
| | | | 370/252 |
| 2016/0007181 A1* | 1/2016 | Palin | H04B 17/10 |
| | | | 455/41.2 |
| 2016/0146934 A1* | 5/2016 | Chawla | G01S 13/74 |
| | | | 342/458 |
| 2018/0146343 A1* | 5/2018 | Lee | A63F 13/35 |
| 2019/0074601 A1* | 3/2019 | Kim | H01Q 1/38 |
| 2019/0075424 A1* | 3/2019 | Zakaria | H04L 67/12 |
| 2019/0116456 A1* | 4/2019 | Arunkumar | H04W 4/023 |

FOREIGN PATENT DOCUMENTS

| | | | |
|---|---|---|---|
| JP | 2008-193595 A | 8/2008 | |
| JP | 2008-199411 A | 8/2008 | |
| JP | 2009-065296 A | 3/2009 | |
| JP | 2009-080743 A | 4/2009 | |
| JP | 2012-074789 A | 4/2012 | |
| JP | 2012-134656 A | 7/2012 | |
| JP | 2013-008091 A | 1/2013 | |
| JP | 2014-239393 A | 12/2014 | |
| JP | 2016-040523 A | 3/2016 | |
| JP | 2016-057647 A | 4/2016 | |
| JP | 2016-092572 A | 5/2016 | |
| JP | 2016-162327 A | 9/2016 | |

OTHER PUBLICATIONS

Japanese Notice of Allowance for JP Application No. 2017-004932 dated Jun. 1, 2021 with English Translation.

\* cited by examiner

FIG. 8

```
                           ┌─────────────── 1
                           │            MEASUREMENT DEVICE
          ┌──────────────┐ │   ┌──────────────┐
  111 ──  │ CONTROL UNIT │ │   │    SIGNAL    │ ── 114
          └──────────────┘ │   │ ANALYSIS UNIT│
          ┌──────────────┐ │   └──────────────┘
  112 ──  │TRANSMISSION  │ │   ┌──────────────┐
          │    UNIT      │ │   │RECORDING UNIT│ ── 115
          └──────────────┘ │   └──────────────┘
          ┌──────────────┐ │   ┌──────────────┐
  113 ──  │  RECEPTION   │ │   │ DISPLAY UNIT │ ── 116
          │   STRENGTH   │ │   └──────────────┘
          │MEASUREMENT UNIT│
          └──────────────┘
```

FIG. 9

<MEASUREMENT RESULT TABLE>

| NUMBER OF TIMES | FIRST TRANSMISSION DEVICE ID | FIRST RECEPTION STRENGTH | SECOND TRANSMISSION DEVICE ID | SECOND RECEPTION STRENGTH | θ1 | θ2 | DISTANCE | TEMPERATURE | HUMIDITY | TIME |
|---|---|---|---|---|---|---|---|---|---|---|
| 1 | | ... | | ... | ... | ... | ... | ... | ... | ... |
| 2 | | ... | | ... | ... | ... | ... | ... | ... | ... |
| 3 | | ... | | ... | ... | ... | ... | ... | ... | ... |
| 4 | | ... | | ... | ... | ... | ... | ... | ... | ... |
| ... | | ... | | ... | ... | ... | ... | ... | ... | ... |

MEASUREMENT DEVICE, MEASUREMENT METHOD, AND PROGRAM

This application is a National Stage of International Application No. PCT/JP2017/044351 filed Dec. 11, 2017, claiming priority based on Japanese Patent Application No. 2017-004932 filed Jan. 16, 2017, the content of which is incorporated herein by reference.

TECHNICAL FIELD

The present invention relates to a measurement device, a measurement method and a program.

BACKGROUND ART

In recent years, transmission devices such as an integrated circuit (IC) tag have been mounted on various management targets. A transmission device transmits a signal and this signal includes identification (ID) that uniquely identifies the transmission device. A reading device that receives the signal transmitted from the transmission device so as to detect the ID. Accordingly, information (positional information and the like) such as the ID of a management target equipped with the transmission device can be acquired so that the management target can be managed using the positional information and the like.

However, due to deterioration of transmission devices over time, it is conceivable that unused transmission devices (new transmission devices) may have been mounted on management targets together with aged transmission devices that have deteriorated (old transmission devices) to manage the management targets. In such a case, a technique of easily detecting a difference between reception strengths of signals from an old transmission device and a new transmission device in a reading device and reception strengths according to distances from the transmission devices in the reading device has been required. In addition, a technique capable of understanding the effects when an old transmission device is exchanged for a new transmission device and when a new transmission device has been mounted in addition to an old transmission device has been required. Related techniques are disclosed in Patent Literature 1 to 3.

CITATION LIST

Patent Literature

[Patent Literature 1]
  Japanese Unexamined Patent Application, First Publication No. 2005-331434
[Patent Literature 2]
  Japanese Unexamined Patent Application, First Publication No. 2009-065296
[Patent Literature 3]
  Japanese Unexamined Patent Application, First Publication No. 2012-134656

SUMMARY OF INVENTION

Problem to be Solved by the Invention

An object of the present invention is to provide a measurement device, a measurement method, and a program for solving the above-described problems.

Means for Solving the Problem

According to a first aspect of the present invention, a measurement device includes: a reception strength measurement unit which measures reception strengths of radio signals having different frequencies transmitted from a plurality of transmission devices; and a recording unit which sequentially records the reception strengths for the plurality of transmission devices.

According to a second aspect of the present invention, a measurement method includes: measuring reception strengths of radio signals having different frequencies transmitted from a plurality of transmission devices; and sequentially recording the reception strengths for the plurality of transmission devices.

According to a third aspect of the present invention, a program causes a computer of a measurement device to perform: a process of measuring reception strengths of radio signals having different frequencies transmitted from a plurality of transmission devices; and a process of sequentially recording the reception strengths for the plurality of transmission devices.

Advantageous Effects of Invention

According to the present invention, it is possible to easily ascertain a difference between reception strengths of signals from an old transmission device and a new transmission device mounted on a management target in a reading device and reception strengths according to distances from the transmission devices in the reading device. In addition, it is possible to easily understand the effects when an old transmission device is exchanged for a new transmission device and when a new transmission device is provided in addition to an old transmission device.

BRIEF DESCRIPTION OF DRAWINGS

FIG. 8 is a functional block diagram of a measurement device according to a fourth embodiment.

FIG. 9 shows a measurement result table created by a recording unit.

DESCRIPTION OF EMBODIMENTS

First Embodiment

Hereinafter, a measurement device according to a first embodiment will be described with reference to the drawings.

Figure 1:
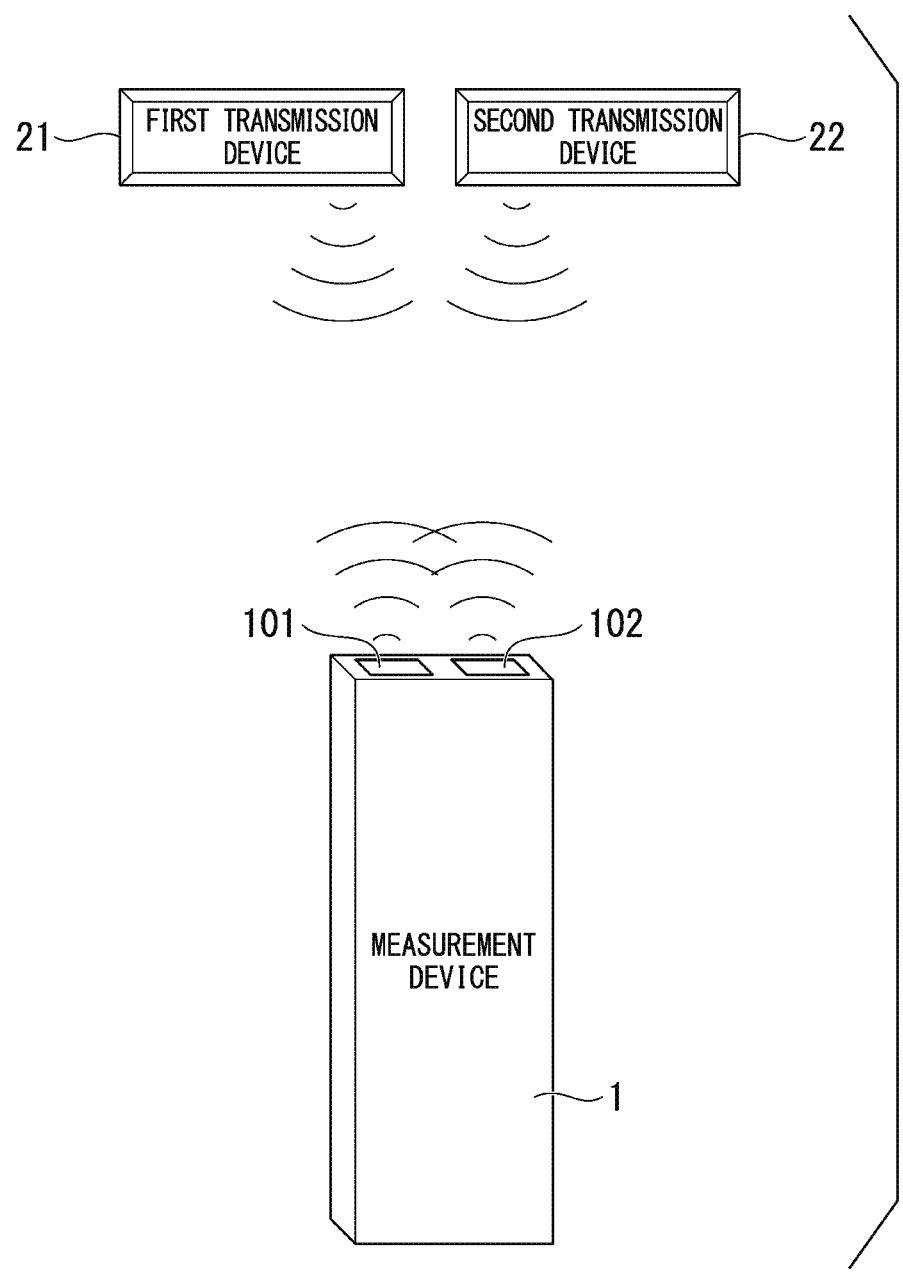
FIG. 1 is a diagram showing an overview of a measurement system including a measurement device and transmission devices according to a first embodiment.

FIG. 1 is a diagram showing an overview of a measurement system including a measurement device and transmission devices according to the first embodiment.

As shown in this figure, the measurement device 1 includes a first antenna 101 and a second antenna 102. The measurement device 1 receives transmitted signals having different frequencies from a plurality of transmission devices mounted on a management target, measures the reception strengths of the transmitted signals and records the reception strengths. A first transmission device 21 has been originally mounted on the management target and a new second transmission device 22 is mounted thereon by a manager when the first transmission device 21 has deteriorated over time. The management target may be a container, a truck, a cargo stand, or the like, for example. As the first transmission device 21 and the second transmission device 22, for example, a transmission device called a radio frequency identification (RFID) tag is assumed. The first antenna 101 is designed to receive signals transmitted from the first transmission device 21. The second antenna 102 is designed to receive signals transmitted from the second transmission device 22.

The measurement device 1 transmits a first transmission request signal through the first antenna 101 and then transmits a second transmission request signal through the second antenna 102 according to an instruction by a user. The first transmission request signal is a signal having a first frequency that can be received by the first transmission device 21. The second transmission request signal is a signal having a second frequency that can be received by the second transmission device 22. When the first frequency of the first transmission request signal and the second frequency of the second transmission request signal can be distinguished from each other on the basis of information included in the signals, the first frequency and the second frequency may be the same frequency. When the first transmission device 21 receives the first transmission request signal, the first transmission device 21 generates an electromotive force according to the RFID technique and transmits a first radio signal having a first frequency by the electromotive force. When the second transmission device 22 receives the second transmission request signal, the second transmission device 22 generates an electromotive force according to the RFID technique and transmits a second radio signal having a second frequency by the electromotive force. As described above, when the first frequency of the first radio signal and the second frequency of the second radio signal can be distinguished from each other on the basis of information included in the signals, the first frequency and the second frequency may be the same frequency.

The first antenna 101 receives the first radio signal. In addition, the second antenna 102 receives the second radio signal. The measurement device 1 measures a first reception strength and a second reception strength of the sequentially received first radio signal and second radio signal. The measurement device 1 records the first reception strength in association with the ID of the first transmission device 21 included in the first radio signal. The measurement device 1 records the second reception strength in association with the ID of the second transmission device 22 included in the second radio signal. When the first frequency and the second frequency are the same frequency, the measurement device 1 may include only one antenna. It is desirable that the measurement device 1 distinguish the first radio signal and the second radio signal from each other on the basis of information included in the radio signals and measure the reception strengths of the radio signals. Hereinafter, an example in which the first frequency and the second frequency are different frequencies will be described.

Figure 2:
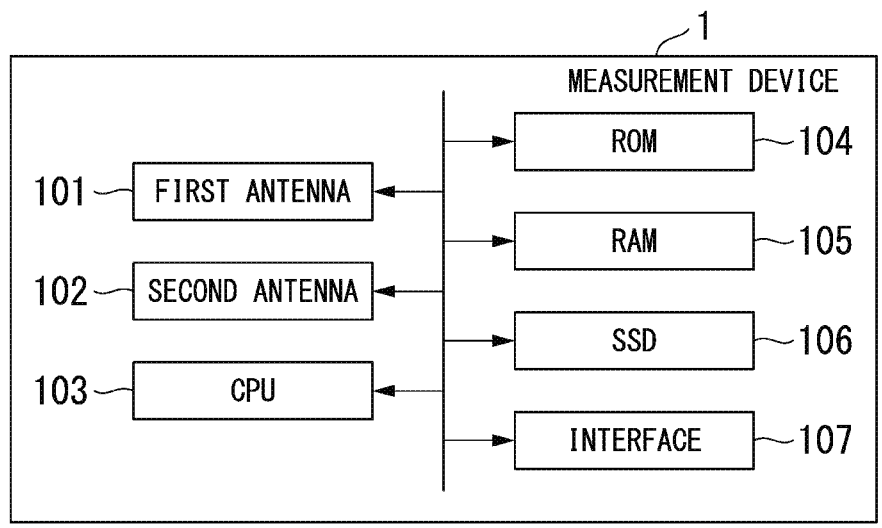
FIG. 2 is a diagram showing a hardware configuration example of the measurement device according to the first embodiment.

FIG. 2 is a diagram showing a hardware configuration example of the measurement device according to the first embodiment.

As shown in FIG. 2, the measurement device 1 may include hardware components of the first antenna 101, the second antenna 102, a central processing unit (CPU) 103, a read only memory (ROM) 104, a random access memory (RAM) 105, a solid state drive (SSD) 106 and an interface 107 as an example. The interface 107 is a liquid crystal touch panel, a button, or the like, for example. The measurement device 1 may further include other hardware components.

Figure 3:
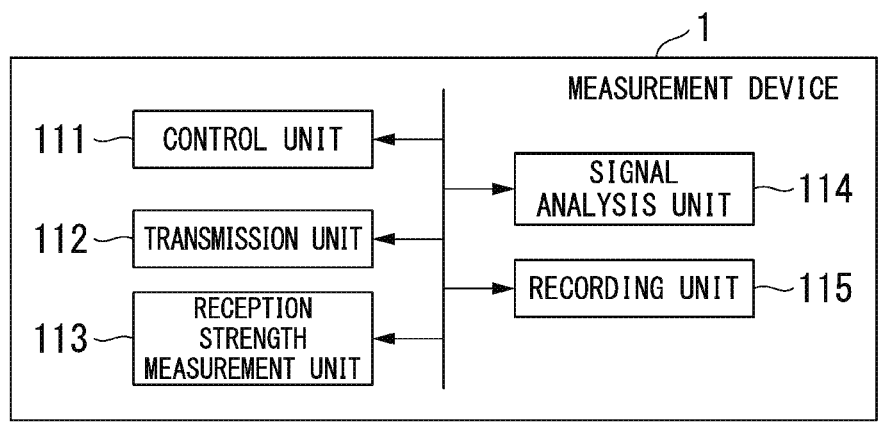
FIG. 3 is a functional block diagram of the measurement device according to the first embodiment.

FIG. 3 is a functional block diagram of the measurement device according to the first embodiment.

As an example, the CPU 103 of the measurement device 1 executes a measurement program stored in advance. Accordingly, the measurement device 1 is provided with functions of a control unit 111, a transmission unit 112, a reception strength measurement unit 113, a signal analysis unit 114 and a recording unit 115. Some of these functions may be realized in the measurement device 1 by an electronic circuit.

The control unit 111 controls other functional units.

The transmission unit 112 detects start of measurement on the basis of a signal acquired from the interface 107 (FIG. 2) and then performs control of causing a transmission request signal to be output to the first transmission device 21 from the first antenna 101 and control of causing a transmission request signal to be output to the second transmission device 22 from the second antenna 102.

The reception strength measurement unit 113 measures reception strengths of radio signals transmitted from the plurality of transmission devices 21 and 22, such as received signal strength indicators (RSSIs), for each transmission device.

The signal analysis unit 114 analyzes information included in radio signals transmitted from the transmission devices 21 and 22. For example, the signal analysis unit 114 analyzes the IDs of the transmission devices 21 and 22 included in the radio signals.

The recording unit 115 sequentially records the reception strengths measured by the reception strength measurement unit 113 in association with information that is analysis results in the signal analysis unit 114 in a storage unit such as the SSD 106 (FIG. 2) or the like.

Figure 4:
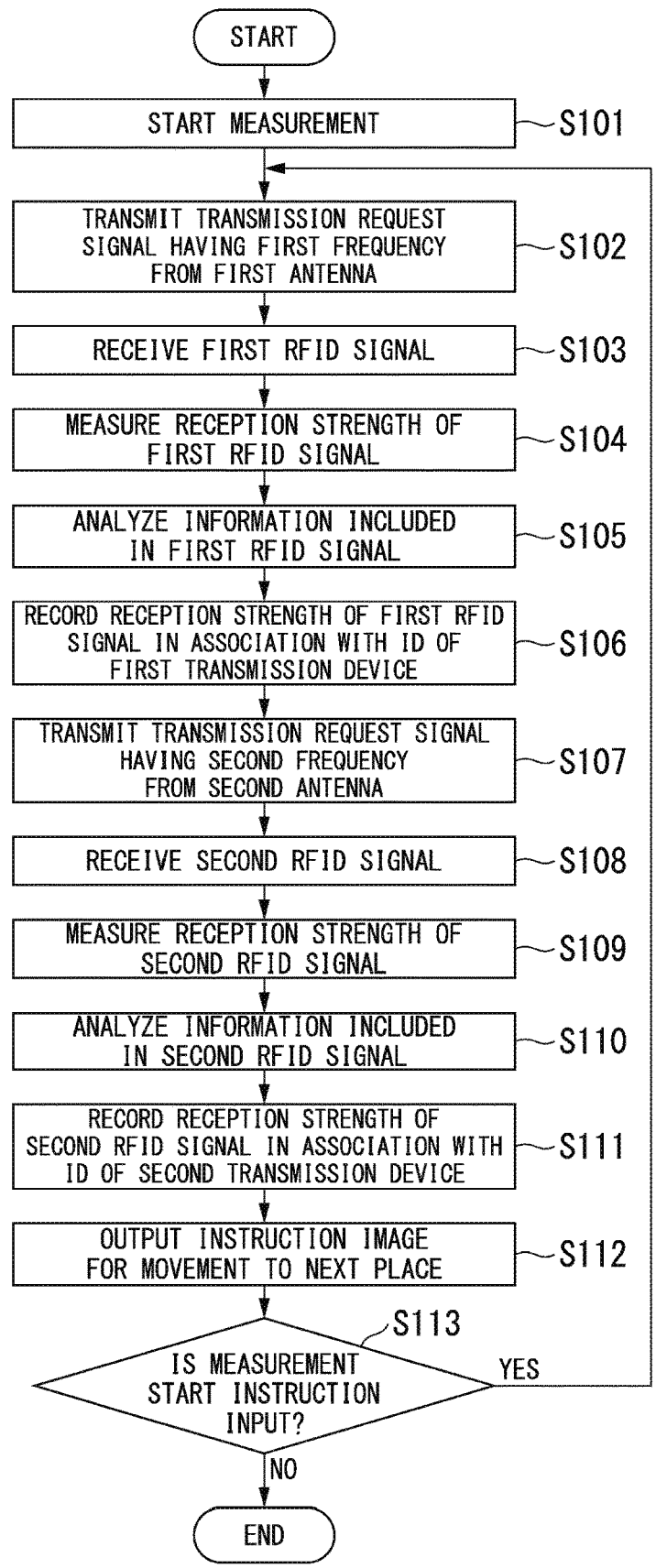
FIG. 4 is a diagram showing a processing flow of the measurement device according to the first embodiment.

FIG. 4 is a diagram showing a processing flow of the measurement device according to the first embodiment.

Next, a process of the measurement device 1 according to the first embodiment will be described in order.

First, when a user operates the interface 107 provided in the measurement device 1, the control unit 111 of the measurement device 1 receives an input of measurement start (step S101). The control unit 111 outputs a measurement start signal to the transmission unit 112. When the transmission unit 112 detects measurement start, the transmission unit 112 causes a transmission request signal having the first frequency to be transmitted from the first antenna 101 (step S102).

The first transmission device 21 receives the transmission request signal having the first frequency. The first transmission device 21 outputs a first RFID signal using an electromotive force based on reception of the signal. The first RFID signal includes information such as the ID of the first transmission device 21.

The first antenna 101 receives the first RFID signal (step S103).

The reception strength measurement unit 113 measures a reception strength when the first RFID signal is received through the first antenna 101 (step S104). A known RSSI measurement technique may be used for measurement of the reception strength. The reception strength measurement unit 113 outputs, to the recording unit 115, the reception strength when the first RFID signal is received.

The signal analysis unit 114 analyzes information included in the first RFID signal received through the first antenna 101 (step S105). The signal analysis unit 114 outputs the information included in the received first RFID signal to the recording unit 115.

The recording unit 115 records the reception strength measured through the reception strength measurement unit 113 in association with the ID of the first transmission device 21 which is an example of the information included in the first RFID signal in a storage unit such as the SSD 106 (step S106).

When the process with respect to the first transmission device 21 ends, the control unit 111 instructs a signal to be transmitted from the second antenna 102. When the transmission unit 112 detects the instruction, the transmission unit 112 causes a transmission request signal having the second frequency to be transmitted from the second antenna 102 (step S107).

The second transmission device 22 receives the transmission request signal having the second frequency. The second transmission device 22 outputs a second RFID signal using an electromotive force based on reception of the signal. The second RFID signal includes information such as the ID of the second transmission device 22.

The second antenna 102 receives the second RFID signal (step S108).

The reception strength measurement unit 113 measures a reception strength when the second RFID signal is received through the second antenna 102 (step S109). A known RSSI measurement technique may be used for measurement of the reception strength. The reception strength measurement unit 113 outputs, to the recording unit 115, the reception strength when the second RFID signal is received.

The signal analysis unit 114 analyzes information included in the second RFID signal received through the second antenna 102 (step S110). The signal analysis unit 114 outputs the information included in the received second RFID signal to the recording unit 115.

The recording unit 115 records the reception strength measured through the reception strength measurement unit 113 in association with the ID of the second transmission device 22 which is an example of the information included in the second RFID signal in a storage unit such as the SSD 106 (step S111).

When the process with respect to the first antenna 101 and the process with respect to the second antenna 102 end, the control unit 111 outputs an instruction image instructing movement to the next place to a liquid crystal touch panel which is the interface 107 (step S112). The user moves to other positions. That is, the user moves according to the displayed instruction image. Then, the user starts, by operating the interface 107, measurement with respect to the first and second transmission devices 21 and 22 mounted on the same management target. The measurement device 1 measures reception strengths of radio signals that is transmitted from the first transmission device 21 and is transmitted from different positions regarding the same management target. The control unit 111 of the measurement device 1 determines whether an instruction of the next measurement is input (step S113). When the instruction of the next measurement is input (YES in step S113), the control unit 111 repeatedly performs the process from step S102. The control unit 111 ends the process when an instruction of measurement completion is input (NO in step S113).

The user inputs an operation of starting measurement with respect to the first transmission device 21 and the second transmission device 22 provided at almost the same position on the management target whenever the user repeats movement. That is, the user repeats a measurement process for the first transmission device 21 and the second transmission device 22 at similar distances from the measurement device 1 while changing the distances therefrom and positions thereof. Accordingly, measurement of reception strengths with respect to the first transmission device 21 and the second transmission device 22 at a plurality of distant positions can be performed. In addition, the user can measure reception strengths at a plurality of positions distant from positions at which the first transmission device 21 and the second transmission device 22 are mounted on the management target simply by repeating movement and inputting a measurement start instruction. A reception strength distribution according to relative positions from the first transmission device 21 and the second transmission device 22 can be measured using information recorded in the SSD 106.

Accordingly, it is possible to measure a difference between reception strengths of radio signals received from the first transmission device 21 (old transmission device) and the second transmission device 22 (new transmission device) mounted on the management target. In addition, it is possible to easily understand the effects when the first transmission device 21 (old transmission device) is exchanged for the second transmission device 22 (new transmission device) and when the second transmission device 22 (new transmission device) is provided in addition to the first transmission device 21 (old transmission device).

In the first embodiment, the user may input a distance from the positions of the first transmission device 21 and the second transmission device 22 to a position at which the user instructs measurement to be started to the interface 107 whenever measurement is instructed to be started. In such a case, the recording unit 115 of the measurement device 1 records information on a distance which has been input in association with the IDs of the first transmission device and the second transmission device in step S106 and step S111 of the first embodiment, for example. Accordingly, it is possible to easily ascertain reception strengths according to distances from the first transmission device 21 (old transmission device) and the second transmission device 22 (new transmission device) to the measurement device 1. That is, it is possible to ascertain a directivity difference according to distances to the transmission devices 21 and 22.

Second Embodiment

Figure 5:
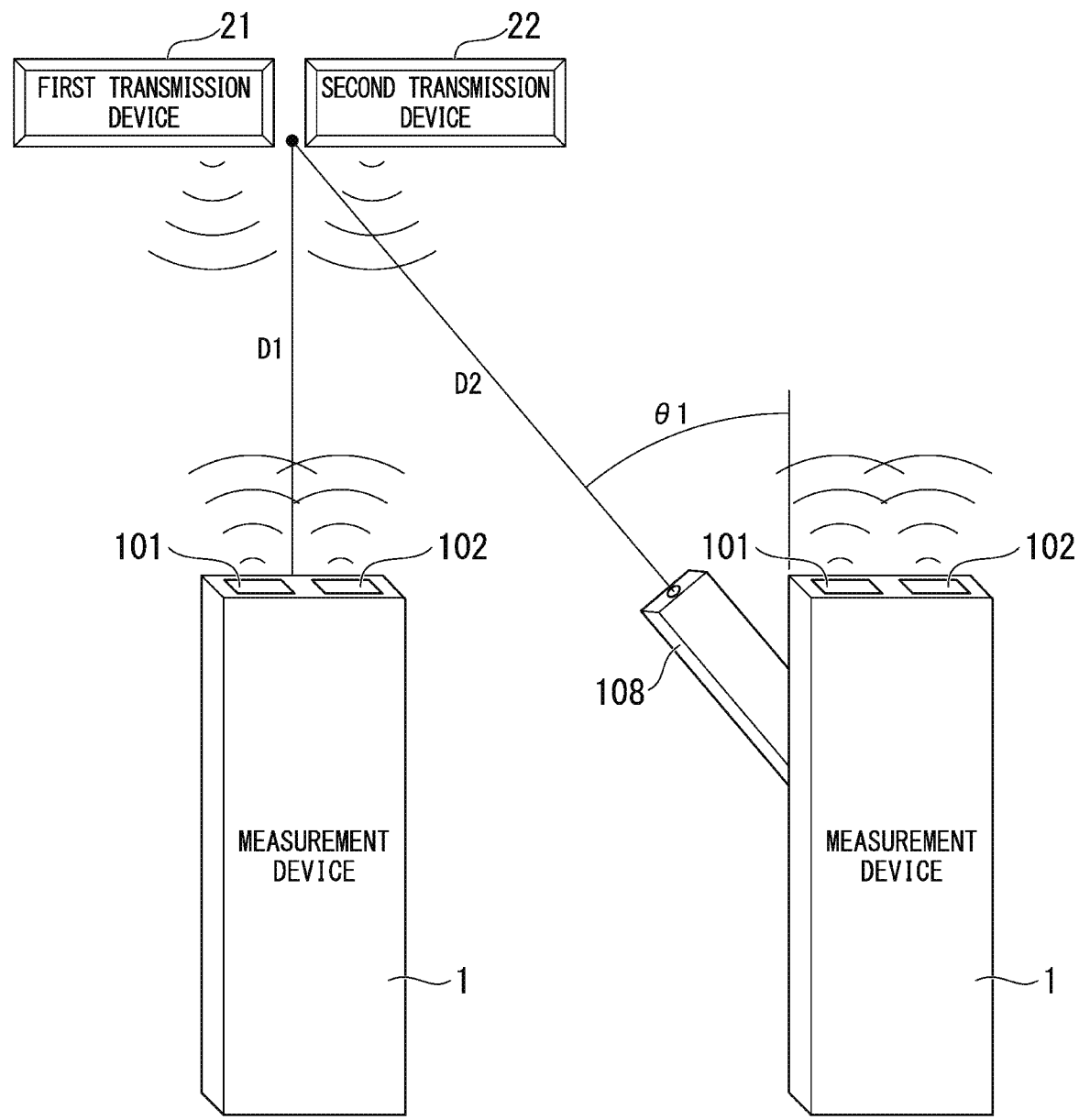
FIG. 5 is a diagram showing an overview of a measurement system including a measurement device and transmission devices according to a second embodiment.

FIG. 5 is a diagram showing an overview of a measurement system including a measurement device and transmission devices according to a second embodiment of the present invention.

As shown in this figure, the measurement device 1 may include a range finder 108 capable of measuring distances to and directions of the positions of the first transmission device 21 and the second transmission device 22. That is, the range finder 108 has a direction measurement function. The directions of the first transmission device 21 and the second transmission device 22 are represented by a horizontal angle θ1 formed by the axial direction of the first antenna 101 and the second antenna 102 mounted on the measurement device 1 and the axial direction of the range finder 108. The horizontal angle θ1 is an angle formed by the axial direction of the first antenna 101 and the second antenna 102 and the axial direction of the range finder 108 in the same horizontal plane. Other hardware components of the measurement device 1 are the same as the hardware components shown in FIG. 2. The range finder 108 includes a laser diode (not shown), for example, and receives reflected light of a laser beam transmitted from the laser diode. The range finder 108 measures distances D1 and D2 to a reflection point at which the laser beam has been reflected using a difference between a laser beam transmission time and a reflected light reception time and a phase difference. A known technique may be used as a distance measurement technique performed by the range finder 108. Further, the range finder 108 detects a rotation angle from a predetermined position of a rotation mechanism thereof and measures the horizontal angle θ1. The range finder 108 outputs information on the distances D1 and D2 and information on the horizontal angle θ1 to the recording unit 115 of the measurement device 1.

When instructing the start of measurement, the user directs the range finder 108 toward the first transmission device 21 and the second transmission device 22. Then, when the control unit 111 receives an input of measurement start in step S101 as in the first embodiment, the control unit 111 outputs a measurement instruction to the range finder 108. The range finder 108 measures the distance D2 to the first transmission device 21 and the second transmission device 22 and the horizontal angle θ1. The range finder 108 outputs information on the measured distance D2 and horizontal angle θ1 to the recording unit 115 of the measurement device 1. The recording unit 115 of the measurement device 1 further records the information on the distance D2 and horizontal angle θ1 in association with the IDs of the first transmission device and the second transmission device in step S106 and step S111 of the first embodiment, for example.

The user holds the measurement device 1 such that the axial direction of the antennas of the measurement device 1 is perpendicular to the surface of the management target equipped with the first transmission device 21 and the second transmission device 22 when the user performs measurement, as shown in FIG. 5. That is, even when the user changes relative positions of the first transmission device 21 and the second transmission device 22 and performs measurement, reception strengths of radio signals from each of the respective transmission devices 21 and 22 are measured without changing the axial directions of the first antenna 101 and the second antenna 102 included in the measurement device 1. Here, the range finder 108 automatically determines the horizontal angle θ1 and the distance D2. Accordingly, it is possible to determine, using the information on the angle θ1 and the distance D2, at which relative position from the transmission device 21 and 22 recorded information on a reception strength has been measured, when creating a reception strength distribution later.

Figure 6:
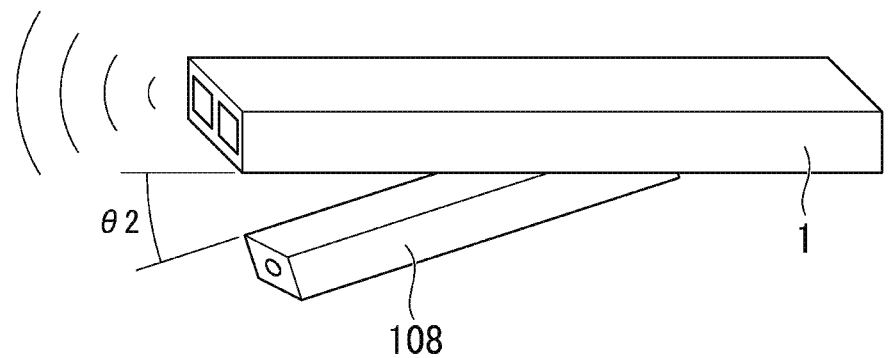
FIG. 6 is a diagram showing another example of the measurement device.

FIG. 6 is a diagram showing another example of the measurement device.

The range finder 108 of the measurement device 1 shown in FIG. 6 can additionally measure a vertical angle θ2 formed by the axial direction of the first antenna 101 and the second antenna 102 mounted on the measurement device 1 and the axial direction of the range finder 108. The vertical angle θ2 is an angle formed by the axial direction of the first antenna 101 and the second antenna 102 and the axial direction of the range finder 108 in the same vertical plane. That is, the measurement device 1 can measure both the horizontal angle θ1 and the vertical angle θ2. As in the case shown in FIG. 5, the control unit 111 outputs a measurement instruction to the range finder 108 when the control unit 111 receives an input of measurement start in step S101. The range finder 108 measures distances to the first transmission device 21 and the second transmission device 22, the horizontal angle θ1 and the vertical angle θ2.

The range finder 108 outputs information on the measured distances, and the horizontal angle θ1 and vertical angle θ2 to the recording unit 115 of the measurement device 1. The recording unit 115 of the measurement device 1 further records the information on the distances, the horizontal angle θ1 and the vertical angle θ2 in association with the IDs of the first transmission device and the second transmission device in step S106 and step S111 of the first embodiment, for example.

Accordingly, it is possible to ascertain reception strengths according to distances from the first transmission device 21 (old transmission device) and the second transmission device 22 (new transmission device) to the measurement devices 1 and relative direction with high accuracy. That is, it is possible to ascertain a directivity difference and characteristics according to distances and relative directions of the transmission devices 21 and 22 with high accuracy.

Third Embodiment

Figure 7:
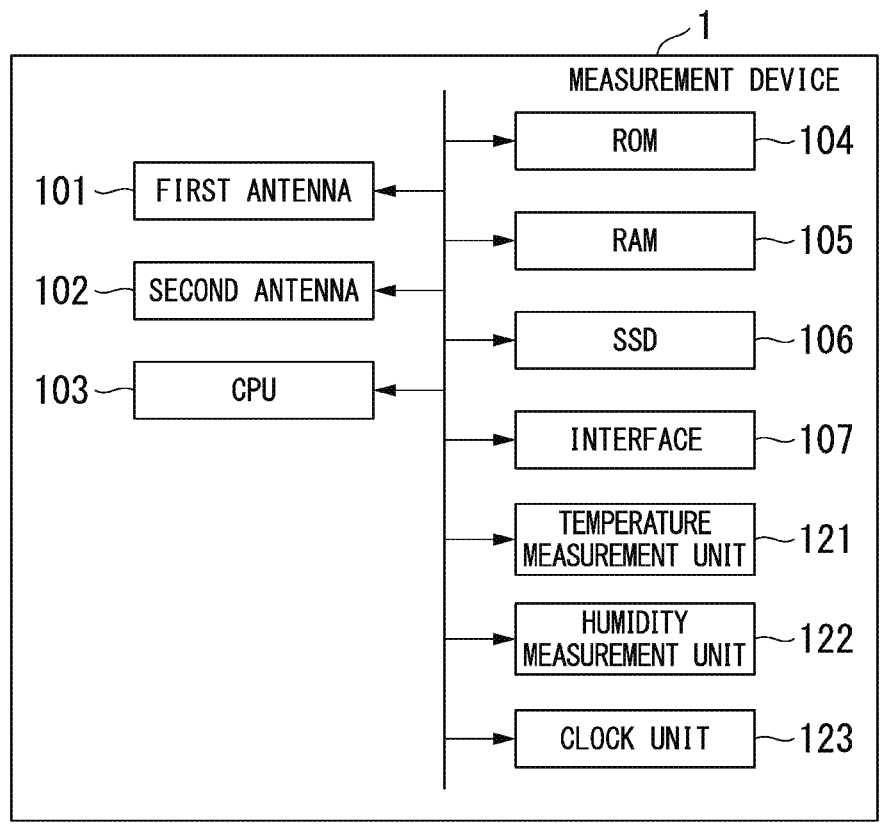
FIG. 7 is a diagram showing a hardware configuration example of a measurement device according to a third embodiment.

FIG. 7 is a diagram showing a hardware configuration example of a measurement device according to a third embodiment.

As shown in FIG. 7, the measurement device 1 includes a temperature measurement unit 121, a humidity measurement unit 122 and a clock unit 123 in addition to the hardware components described in FIG. 3. The third embodiment may also include the component of the range finder 108 described in the second embodiment.

As in the first embodiment, when the control unit 111 receives an input of measurement start in step S101, the control unit 111 outputs a measurement instruction to the temperature measurement unit 121, the humidity measurement unit 122 and the clock unit 123. The temperature measurement unit 121 measures the temperature of the surrounding environment of the measurement device 1. The humidity measurement unit 122 measures the humidity of the surrounding environment of the measurement device 1. The clock unit 123 counts time. The temperature measurement unit 121 outputs the measured temperature to the recording unit 115. The humidity measurement unit 122 outputs the measured humidity to the recording unit 115. The clock unit 123 outputs a date and a time at which measurement has been instructed to be started to the recording unit 115. The recording unit 115 of the measurement device 1 further records information such as a temperature, a humidity, a date and a time in association with the IDs of the first transmission device 21 and the second transmission device 22 in step S106 and step S111 of the first embodiment, for example.

In this manner, information such as a temperature, a humidity, and a date and a time is recorded in association with reception strengths of radio signals transmitted from the first transmission device 21 and the second transmission device 22. Accordingly, at the time of measurement, it is possible to record information such as a temperature, a humidity and a time which are surrounding environments in which reception strengths are measured.

Hence, it is possible to ascertain a directivity difference and characteristics of the first transmission device 21 (old transmission device) and the second transmission device 22 (new transmission device), which are different according to surrounding environmental elements of the measurement device 1, such as a temperature, a humidity and a time.

Fourth Embodiment

FIG. 8 is a functional block diagram of a measurement device according to a fourth embodiment.

As shown in FIG. 8, the measurement device 1 further includes a function of a display unit 116 in addition to the functional components described in FIG. 3.

The display unit 116 performs a process of displaying information recorded by the recording unit 115 in the SSD 106. Further, the measurement device 1 may further include the function of the display unit 116 in addition to the functions described in the second embodiment and the third embodiment.

FIG. 9 shows a measurement result table created by the recording unit.

As an example, the recording unit 115 of the measurement device 1 can perform the above-described recording process in each embodiment to create the measurement result table shown in FIG. 9. In the measurement result table shown in FIG. 9, the number of times of measurement, the ID of the first transmission device and a first reception strength when the first antenna 101 receives a radio signal transmitted from the first transmission device 21 are associated with one another and stored. Further, the ID of the second transmission device and a second reception strength when the second antenna 102 receives a radio signal transmitted from the second transmission device 22 are associated with each other and stored in the measurement result table. In addition, the horizontal angle θ1, the vertical angle θ2, distances to the transmission devices, a temperature, a humidity and a time are associated with one another and stored in the measurement result table.

The display unit 116 of the measurement device 1 acquires the measurement result table stored in the SSD 106 and displays the measurement result table on a liquid crystal screen of the interface 107. For example, the display unit 116 performs a process of displaying the measurement result table on the basis of an instruction from the user.

Figure 10:
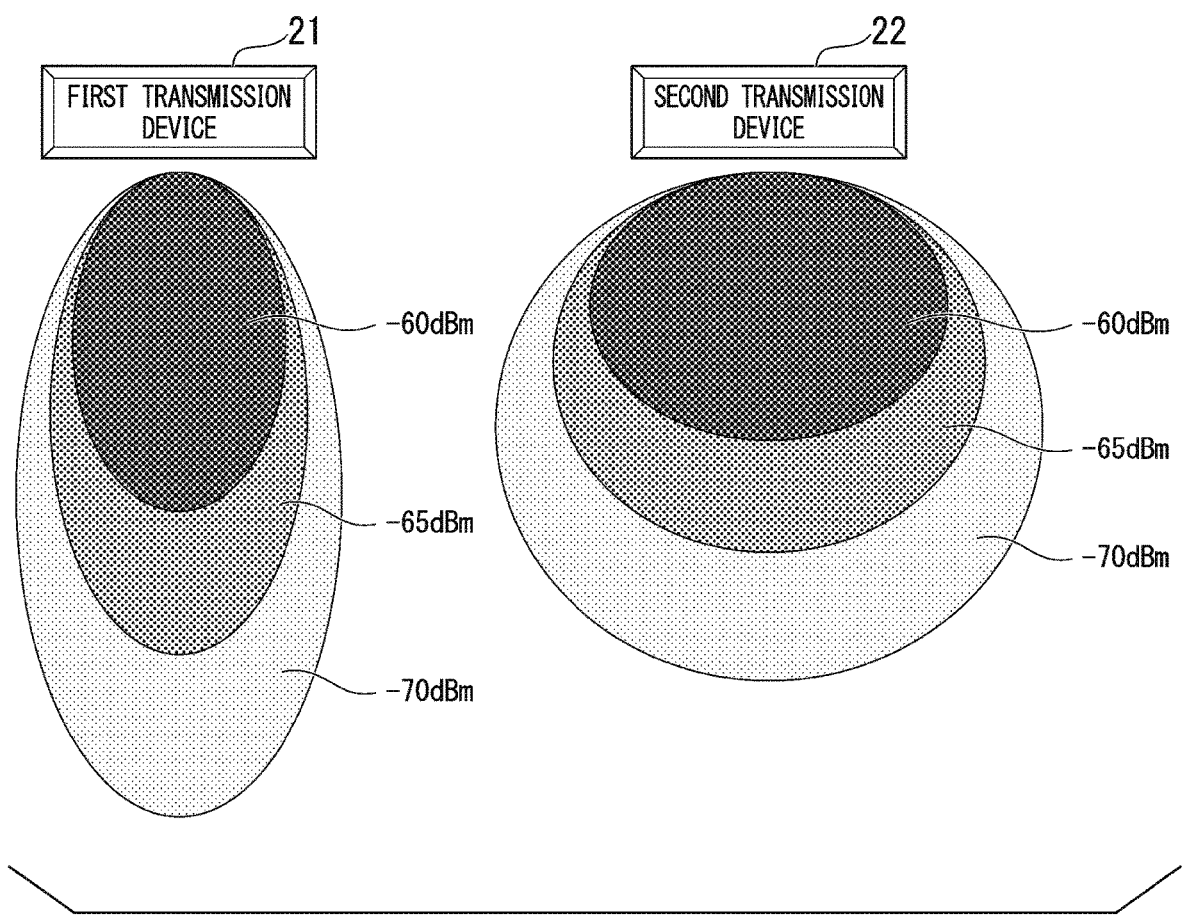
FIG. 10 is a diagram showing reception strength distributions created on the basis of measurement results.

FIG. 10 is a diagram showing reception strength distributions created on the basis of measurement results.

The display unit 116 of the measurement device 1 may create a reception strength distribution for each transmission device as shown in FIG. 10 using information recorded in a measurement result table and display the reception strength distribution on the liquid crystal screen of the interface 107.

First, the display unit 116 creates a reception strength distribution of radio signals transmitted from the first transmission device 21. Here, the display unit 116 acquires at least a first reception strength, which is a reception strength of a radio signal transmitted from the first transmission device 21, the horizontal angle θ1 and a distance for each of the recorded measurement times. The display unit 116 calculates a relative position from the measurement device 1 on the basis of the horizontal angle θ1 and the distance. The display unit 116 calculates a plurality of different relative positions which are estimated to have the same reception strength through interpolation calculation and the like on the basis of the calculated relative position and a plurality of combinations of reception strengths at that position. The display unit 116 connects the plurality of relative positions estimated to have the same reception strength with an oval arc to create a reception strength distribution with respect to the first transmission device 21 as shown in FIG. 10. In addition, the display unit 116 creates a reception strength distribution with respect to the second transmission device 22 as shown in FIG. 10. The display unit 116 displays an image showing the reception strength distribution with respect to the first transmission device 21 and the reception strength distribution with respect to the second transmission device 22 on the liquid crystal screen of the interface 107.

By performing the aforementioned process, reception strength distributions of radio signals transmitted from the two transmission devices 21 and 22 mounted on the management target can be displayed.

The display unit 116 may further create reception strength distributions on the basis of the vertical angle θ2. Accordingly, it is possible to create reception strength distributions with respect to the respective transmission devices 21 and 22 with higher accuracy. In addition, the display unit 116 may create reception strength distributions on the basis of surrounding environmental elements of the measurement device 1, such as a temperature, a humidity and a time. Accordingly, it is possible to create reception strength distributions of the respective transmission devices 21 and 22 in consideration of surrounding environmental elements.

The user may create the reception strength distributions shown in FIG. 10 in a device other than the measurement device 1. In this case, the user operates the measurement device 1 to instruct information of a measurement result table to be transmitted to a predetermined device. The measurement device 1 transmits the information of the measurement result table to the predetermined device that is instructed. Generation of reception strength distributions in the device which has received the measurement result table may be performed through the same process as the aforementioned process.

Fifth Embodiment

In each of the above-described embodiments, the reception strength measurement unit 113 detects the reception strength of the first RFID signal received through the first antenna 101 and the reception strength of the second RFID signal received through the second antenna 102. In this detection, the reception strength measurement unit 113 may receive RFID signals which are a plurality of radio signals from each transmission device in one-time measurement and calculate a statistic on the basis of reception strengths based on a plurality of receptions of such RFID signals. The reception strength measurement unit 113 outputs the calculated statistic to the recording unit 115 as a reception strength. For example, the statistic may be a mean, a median or the like. The recording unit 115 records the acquired statistic of reception strengths with respect to each transmission device in association with the ID of each transmission device. In this manner, the reception strength measurement unit 113 may measure reception strengths on the basis of reception strengths of radio signals received a plurality of number of times at the same position. Accordingly, it is possible to measure a reception strength according to each position with higher accuracy.

A plurality of embodiments among the first to fifth embodiments may be combined and used. Accordingly, it is possible to more appropriately ascertain a directivity difference and characteristics of the first transmission device 21 (old transmission device) and the second transmission device 22 (new transmission device) combined with a distance, a direction and an environment. Therefore, it is possible to more appropriately understand the effects when the first transmission device 21 (old transmission device) is exchanged for the second transmission device 22 (new transmission device) and when the second transmission device 22 (new transmission device) has been mounted in addition to the first transmission device 21 (old transmission device).

The aforementioned program may be for the purpose of realizing some of the functions of the above-described processing units. Further, the program may be a so-called difference file (difference program) which can realize the above-described functions in combination with a program which has already been recorded in a computer system.

Figure 11:
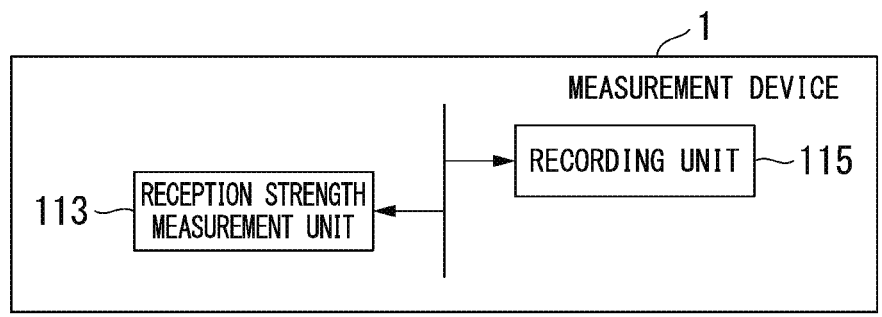
FIG. 11 is a diagram showing minimum components of the measurement device.

FIG. 11 is a diagram showing minimum components of the measurement device.

As shown in FIG. 11, the measurement device 1 includes at least a reception strength measurement unit which measures reception strengths of a plurality of radio signals having different frequencies transmitted from a plurality of different transmission devices and a recording unit which sequentially records reception strengths for each of the plurality of transmission devices. The measurement device 1 may be a measurement circuit.

Some or all of the aforementioned embodiments may also be described as in the following supplementary notes, but they are not limited to the following supplementary notes:

(Supplementary Note 1)
A measurement device including:
a reception strength measurement unit configured to measure reception strengths of radio signals having different frequencies transmitted from a plurality of transmission devices; and
a recording unit configured to sequentially record the reception strengths for the plurality of transmission devices.

(Supplementary Note 2)
The measurement device described in Supplementary Note 1, including a plurality of antennas which perform communication with the plurality of transmission devices, respectively.

(Supplementary Note 3)
The measurement device described in Supplementary Note 2, further including a transmission unit configured to sequentially output transmission request signals with respect to the transmission devices through the plurality of antennas after measurement start is detected,
wherein the reception strength measurement unit measures the reception strengths of the radio signals transmitted from the plurality of transmission devices according to the transmission request signals.

(Supplementary Note 4)
The measurement device described in any one of Supplementary Notes 1 to 3, wherein the recording unit records, for the plurality of transmission devices, statistics of the reception strengths based on the radio signals transmitted from each of the plurality of transmission devices in a plurality of number of times.

(Supplementary Note 5)
The measurement device described in any one of Supplementary Notes 1 to 4, further including a range finder configured to measure distance to the plurality of transmission devices,
wherein the recording unit further records the distances to the plurality of transmission devices in association with the reception strengths for the plurality of transmission devices.

(Supplementary Note 6)
The measurement device described in any one of Supplementary Notes 1 to 5, further including a direction measurement unit configured to measure direction of the plurality of transmission devices,
wherein the recording unit further records the directions of the plurality of transmission devices in association with the reception strengths for the plurality of transmission devices.

(Supplementary Note 7)
The measurement device described in any one of Supplementary Notes 1 to 6, further including a temperature measurement unit configured to measure a surrounding temperature,
wherein the recording unit further records the surrounding temperature in association with the reception strengths for the plurality of transmission devices.

(Supplementary Note 8)
The measurement device described in any one of Supplementary Notes 1 to 7, further including a humidity measurement unit configured to measure a surrounding humidity,
wherein the recording unit records the surrounding humidity in association with the reception strengths for the plurality of transmission devices.

(Supplementary Note 9)
The measurement device described in any one of Supplementary Notes 1 to 8, further including a clock unit configured to count time,
wherein the recording unit further records times at which the reception strengths have been measured in association with the reception strengths for the plurality of transmission devices.

(Supplementary Note 10)
The measurement device described in any one of Supplementary Notes 1 to 9, further including a display unit configured to display information recorded by the recording unit.

(Supplementary Note 11)
A measurement method including:
measuring reception strengths of radio signals having different frequencies transmitted from a plurality of transmission devices; and
sequentially recording the reception strengths for the plurality of transmission devices.

(Supplementary Note 12)
A program causing a computer of a measurement device to perform processes, the processes comprising:
measuring reception strengths of radio signals having different frequencies transmitted from a plurality of transmission devices; and
recording sequentially the reception strengths for the plurality of transmission devices.

INDUSTRIAL APPLICABILITY

According to the present invention, it is possible to easily ascertain a reception strength difference between signals from an old transmission device and a new transmission device mounted on a management target in a reading device and reception strengths in the reading device according to distances from the transmission devices. In addition, it is possible to easily understand the effects when an old transmission device is exchanged for a new transmission device and when a new transmission device is provided in addition to an old transmission device.

REFERENCE SIGNS LIST

1 Measurement device
21 First transmission device

22 Second transmission device
101 First antenna
102 Second antenna
103 CPU
104 ROM
105 RAM
106 SSD
107 Interface
108 Range finder
111 Control unit
112 Transmission unit
113 Reception strength measurement unit
114 Signal analysis unit
115 Recording unit
116 Display unit
121 Temperature measurement unit
122 Humidity measurement unit
123 Clock unit

The invention claimed is:

1. A measurement device comprising:
a plurality of antennas which perform communication a first transmission device mounted on a management target and a second transmission device mounted on the management target, respectively;
a transmission unit implemented by a CPU of the measurement device and configured to sequentially output transmission request signals with respect to the first transmission device and the second transmission device through the plurality of antennas after measurement start is detected;
a reception strength measurement unit implemented by the CPU and configured to measure reception strengths of first radio signals transmitted from the first transmission device and second radio signals transmitted from the second transmission device according to the transmission request signals, wherein a frequency of the first radio signals is different from a frequency of the second radio signals; and
a recording unit implemented by the CPU and configured to sequentially record the reception strengths of the first radio signals and the reception strengths of the second radio signals in association with the first transmission device and the second transmission device respectively.

2. The measurement device according to claim 1, wherein the recording unit records, for the first transmission device and the second transmission device, statistics of the reception strengths based on the first radio signals transmitted from the first transmission device and the second radio signals transmitted from the second transmission device in a plurality of number of times.

3. The measurement device according to claim 1, further comprising a range finder configured to measure distance to the first transmission device and the second transmission device,
wherein the recording unit further records the distances to the first transmission device and the second transmission device in association with the reception strengths for the first transmission device and the second transmission device respectively.

4. The measurement device according to claim 1, further comprising a direction measurement unit implemented by the CPU and configured to measure direction of the first transmission device and the second transmission device,
wherein the recording unit further records the directions of the first transmission device and the second transmission device in association with the reception strengths for the first transmission device and the second transmission device respectively.

5. The measurement device according to claim 1, further comprising a temperature measurement unit configured to measure a surrounding temperature,
wherein the recording unit further records the surrounding temperature in association with the reception strengths for the first transmission device and the second transmission device.

6. The measurement device according to claim 1, further comprising a humidity measurement unit implemented by the CPU and configured to measure a surrounding humidity,
wherein the recording unit further records the surrounding humidity in association with the reception strengths for the first transmission device and the second transmission device.

7. The measurement device according to claim 1, further comprising a clock unit implemented by the CPU and configured to count time,
wherein the recording unit further records times at which the reception strengths have been measured in association with the reception strengths for the first transmission device and the second transmission device.

8. The measurement device according to claim 1, further comprising a display unit configured to display information recorded by the recording unit.

9. A measurement method comprising:
performing communication a first transmission device mounted on a management target and a second transmission device mounted on the management target, respectively;
sequentially outputting transmission request signals with respect to the first transmission device and the second transmission device after measurement start is detected;
measuring reception strengths of first radio signals transmitted from the first transmission device and second radio signals transmitted from the second transmission device according to the transmission request signals, wherein a frequency of the first radio signals is different from a frequency of the second radio signals; and
sequentially recording the reception strengths of the first radio signals and the reception strengths of the second radio signals in association with the first transmission device and the second transmission device respectively.

10. A non-transitory computer-readable recording medium storing a program causing a computer of a measurement device to perform processes, the processes comprising:
performing communication a first transmission device mounted on a management target and a second transmission device mounted on the management target, respectively;
sequentially outputting transmission request signals with respect to the first transmission device and the second transmission device after measurement start is detected;
measuring reception strengths of first transmitted from the first transmission device and second radio signals transmitted from the second transmission device according to the transmission request signals, wherein a frequency of the first radio signals is different from a frequency of the second radio signals;
sequentially recording the reception strengths of the first radio signals and the reception strengths of the second radio signals in association with the first transmission device and the second transmission device respectively.

\* \* \* \* \*